United States Patent
Li

(10) Patent No.: US 8,423,211 B2
(45) Date of Patent: Apr. 16, 2013

(54) PROTECTION METHOD FOR LIMITED CHARGING/DISCHARGING CURRENT OF HYBRID ELECTRIC VEHICLE BATTERY AND A DEVICE AND A SYSTEM THEREOF

(75) Inventor: Fang Li, Anhui (CN)

(73) Assignee: Chery Automobile Co., Ltd., Anhui (CN)

( * ) Notice: Subject to any disclaimer, the term of this patent is extended or adjusted under 35 U.S.C. 154(b) by 410 days.

(21) Appl. No.: 12/743,549

(22) PCT Filed: Dec. 24, 2008

(86) PCT No.: PCT/CN2008/073695
§ 371 (c)(1),
(2), (4) Date: May 18, 2010

(87) PCT Pub. No.: WO2009/089718
PCT Pub. Date: Jul. 23, 2009

(65) Prior Publication Data
US 2010/0250041 A1    Sep. 30, 2010

(30) Foreign Application Priority Data

Dec. 29, 2007   (CN) .......................... 2007 1 0306999

(51) Int. Cl.
*B60L 9/00*     (2006.01)
*B60L 11/00*    (2006.01)
*G05D 1/00*     (2006.01)
*G05D 3/00*     (2006.01)
*G06F 7/00*     (2006.01)
*G06F 17/00*    (2006.01)
*B60W 10/24*    (2006.01)
*B60W 20/00*    (2006.01)

(52) U.S. Cl.
USPC ........... 701/22; 320/128; 180/65.29; 903/903

(58) Field of Classification Search ........ 180/65.1–65.8; 318/139; 320/100–167; 701/22; 903/902–960
See application file for complete search history.

(56) References Cited

U.S. PATENT DOCUMENTS 6,034,510 A * 3/2000 Kikuchi et al. ............... 320/148
6,218,812 B1 * 4/2001 Hanson ......................... 320/161
(Continued)

FOREIGN PATENT DOCUMENTS

CN    1684850 A    10/2005
CN    1980809 A     6/2007
(Continued)

OTHER PUBLICATIONS

PCT/CN2008/073695, European Search Report, Application No. 08870669.2, 8 pages.

*Primary Examiner* — Khoi Tran
*Assistant Examiner* — Abby Lin
(74) *Attorney, Agent, or Firm* — Kilpatrick Townsend & Stockton LLP

(57) ABSTRACT

A limited protection method for charging/discharging current of hybrid electric vehicle battery and a device and a system thereof is disclosed. Said method includes: receiving a power requirement and determining an original torque based on the power requirement; judging a charge/discharge state of the battery and acquiring a limited torque from an actual current and a predefined torque; comparing said original torque with the limited torque to select the smaller one as a final output requirement. The embody of the invention can achieve the real-time limited protection for charge/discharge current of hybrid electric vehicle battery.

5 Claims, 5 Drawing Sheets

U.S. PATENT DOCUMENTS

| | | | |
|---|---|---|---|
| 6,333,620 B1 * | 12/2001 | Schmitz et al. | 320/132 |
| 6,470,983 B1 | 10/2002 | Amano et al. | |
| 6,727,670 B1 * | 4/2004 | Grabowski et al. | 318/432 |
| 2002/0062183 A1 * | 5/2002 | Yamaguchi et al. | 701/22 |
| 2004/0135527 A1 * | 7/2004 | Tatara et al. | 318/139 |
| 2005/0016781 A1 | 1/2005 | Muta | |
| 2005/0284671 A1 * | 12/2005 | Tatara et al. | 180/24.06 |
| 2006/0028178 A1 * | 2/2006 | Hobbs | 320/128 |
| 2007/0139015 A1 * | 6/2007 | Seo et al. | 320/132 |
| 2008/0018111 A1 * | 1/2008 | Yaguchi | 290/40 B |
| 2009/0115365 A1 * | 5/2009 | Heap et al. | 318/434 |

FOREIGN PATENT DOCUMENTS

| | | |
|---|---|---|
| CN | 101071888 A | 11/2007 |
| JP | 2006054937 A | 2/2006 |
| JP | 2006246562 A | 9/2006 |
| JP | 2007126007 A | 5/2007 |
| WO | WO 2006/006293 A1 | 1/2006 |

* cited by examiner

PROTECTION METHOD FOR LIMITED CHARGING/DISCHARGING CURRENT OF HYBRID ELECTRIC VEHICLE BATTERY AND A DEVICE AND A SYSTEM THEREOF

This application claims the priority to Chinese Patent Application No. 200710306999.2, filed with the Chinese Patent Office on Dec. 29, 2007 and entitled "Method for protective limiting of charging and discharging current of battery in hybrid powered vehicle", which is hereby incorporated by reference in its entirety.

FIELD OF THE INVENTION

The present invention relates to a method, device and system for protective limiting of charging and discharging current of a battery in a hybrid powered vehicle.

BACKGROUND OF THE INVENTION

Vehicle emission has become a leading source of atmosphere pollution with increasing vehicle population. Environmental issues of air pollution, acid rain, green house effects, etc., due to fuel vehicle emission have shadowed the development of vehicles, and people also are more devoted to the research and development of clean-fuel electric vehicles with environmental protection while improving fuel vehicles in view of rapid consumption of oil energy sources. Both a hybrid powered vehicles and a pure electric vehicle have earned increasing attention of people, but a power source of the electric vehicle, i.e., a power battery pack, contributes to a highest part of the production cost of the vehicle and also an crucial factor limiting the endurance mileage of the electric vehicle. Therefore, the pure electric vehicle which greatly depends upon the development of the battery has not gained any crucial breakthrough during the development in the past dozens of years, and the hybrid powered vehicle has the advantages of both internal-combustion engine and pure electric vehicles to be advantageous in terms of low oil consumption, low emission, a long driving distance, etc., and thus is the focus of attention of various vehicle manufactures worldwide and also a relatively feasible solution.

The hybrid powered vehicle is provided thereon with two power sources, i.e., an engine and a battery, and the management of the two power sources is important in terms of ensuring normal and efficient operation of a system and durability of the system. An accumulator with good performance as a worldwide puzzle has been in slow development relative to the rapid development of modern electronics and information technologies, so the management of the battery becomes particularly crucial at present.

In a commonly used method for limiting charging and discharging current of a battery, State Of Charge (SOC), voltage and temperature signals of the battery are collected in real time, and then a limiting torque is derived from a lookup table based upon experimental data. An implementation of this method depends upon a large amount of experimental data and these experimental data have to be modified in a timely way as the aging of battery or the varying environment, which may be time and effort consuming.

SUMMARY OF THE INVENTION

In view of this, the invention provides a method, device and system for protective limiting of charging and discharging current of a battery in a hybrid powered vehicle to achieve real time protective limiting of charging and discharging current of the battery in the hybrid powered vehicle.

A method for protective limiting of charging and discharging current of a battery in a hybrid powered vehicle according to an embodiment of the invention includes:

receiving a power request and determining an initial torque value in response to the power request;

determining a charging or discharging state of the battery and calculating a limit torque value from an actual current value and a predetermined limit value; and comparing the initial torque value and the limit torque value and selecting the smaller one of them as a torque request value to be finally output.

Preferably in the foregoing method, when the battery is in a charging state, calculating the limit torque value includes:

when the battery is in a charging state, multiplying by a Hybrid Control Unit a measured voltage value of the battery by a charging current limit value of the battery to derive a charging limit power $P_1$; and when the actual current value is below an initial control value of charging current, taking a output limit power $P_{limit\_1}$ as $P_1$, and calculating a limit torque value from the output limit power and an angular velocity of the motor.

Preferably in the foregoing method, calculating the torque limit value further includes:

when the actual current value is above the initial control value of charging current, performing PI adjusting with $I_{error}=I_{battery}-I_{charge\_limit}$ to derive a torque deviation value $P_{PI\_1}$, wherein $I_{battery}$ is the measured current value of the battery, and $I_{charge\_limit}$ is the charging current limit value of the battery; deriving a resultant output limit power $P_{limit\_1}=P_1+P_{PI\_1}$ from $P_{PI\_1}$ and calculating a limit torque value from the output limit power $P_{limit\_1}$ and an angular velocity of the motor.

Preferably in the foregoing method, calculating the limit torque value includes:

when the battery is in a discharging state, multiplying by a Hybrid Control Unit a measured voltage value of the battery by a discharging current limit value of the battery to derive a discharging limit power value $P_2$; and when the actual current value is below an initial control value of discharging current, taking a output limit power $P_{limit\_2}$ as $P_2$, and calculating a limit torque value from the output limit power and an angular velocity of the motor.

Preferably in the foregoing method, calculating the limit torque value further includes:

when the actual current value is above the initial control value of discharging current, performing PI adjusting with $I_{error}=I_{battery}-I_{discharge\_limit}$ to derive a torque deviation value $P_{PI\_2}$, wherein $I_{battery}$ is the measured current value of the battery, and $I_{discharge\_limit}$ is the discharging current limit value of the battery; deriving a resultant output limit power $P_{limit\_2}=P_2+P_{PI\_2}$; from $P_{PI\_2}$ and $P_2$; and calculating a limit torque value from the output limit power $P_{limit\_2}$ and an angular velocity of the motor.

Preferably in the foregoing method, determining a charging or discharging state of the battery includes: determining a charging or discharging state of the battery from voltage and current signals of the high voltage battery.

An embodiment of the invention further discloses a device for protective limiting of charging and discharging current of a battery in a hybrid powered vehicle, which includes:

a first processing unit adapted to receive a power request and to determine an initial torque value in response to the power request;

a second processing unit adapted to determine a charging or discharging state of the battery and to calculate a limit power value of charging or discharging the battery from BMS feedback values;

a third processing unit adapted to calculate a limit torque value from the limit power value and an angular velocity of a motor; and a fourth processing unit adapted to compare the initial torque value and the limit torque value and to select the smaller one of them as a torque request value to be finally output.

Preferably in the foregoing device, the third processing unit includes:

a first comparison unit 51 adapted to compare an actual current value and an initial control value of charging current; and a first calculation unit 52 adapted to calculate a limit torque value from the output limit power $P_1$ and an angular velocity of the motor when the actual current value is below the initial control value of charging current, and to perform PI adjusting with $I_{error}=I_{battery}-I_{charge\_limit}$ to derive a torque deviation value $P_{PI\_1}$, where $I_{battery}$ is the measured current value, and $I_{charge\_limit}$ is the charging current limit value of the battery, to derive a resultant output limit power $P_{limit\_1}=P_1+P_{PI\_1}$, and to calculate a limit torque value from the output limit power $P_{limit\_1}$ and an angular velocity of the motor when the actual current value is above the initial control value of charging current.

Preferably in the foregoing device, the third processing unit includes:

a second comparison unit adapted to compare an actual current value and an initial control value of discharging current; and a second calculation unit adapted to calculate a limit torque value from the output limit power $P_2$ and an angular velocity of the motor when the actual current value is below the initial control value of discharging current; and to perform PI adjusting with $I_{error}=I_{battery}-I_{discharge\_limit}$ to derive a torque deviation value $P_{PI\_2}$, where $I_{battery}$ is the measured current value of the battery, and $I_{discharge\_limit}$ is the discharging current limit value of the battery, to derive a resultant output limit power $P_{limit\_2}=P_2+P_{PI\_2}$ from $P_{PI\_2}$, and $P_2$, and to calculate a limit torque value from the output limit power $P_{limit\_2}$ and an angular velocity of the motor when the actual current value is above the initial control value of discharging current.

Moreover, an embodiment of the invention further discloses a hybrid powered vehicle system including a Battery Management System BMS, a Hybrid Control Unit HCU, an Engine Management System EMS, a Motor Control Unit MCU, a motor, an engine, a synthesizer and a power transmission system, where the HCU includes a device for protective limiting of charging and discharging current of a battery and the device includes:

a first processing unit adapted to receive a power request and to determine an initial torque value in response to the power request;

a second processing unit adapted to determine a charging or discharging state of the battery and to calculate a limit power value of charging or discharging the battery from BMS feedback values;

a third processing unit adapted to calculate a limit torque value from the limit power value and an angular velocity of a motor; and a fourth processing unit adapted to compare the initial torque value and the limit torque value and to select the smaller one of them as a torque request value to be finally output.

The invention achieves the following beneficial effects:

Since in the invention the Hybrid Control Unit monitors charging and discharging current in real time, and an output torque of the motor is controlled according to variation of current varies to thereby limit current of the battery within a range for normal operation, the invention can save a significant human effort and achieve a better effect of protective limiting of charging and discharging current of the battery.

BRIEF DESCRIPTION OF THE DRAWINGS

The drawings to be used for descriptions of the embodiments of the invention or of the prior art will be briefly described below to make technical solutions of the embodiments or in the prior art more apparent, and evidently the drawings to be described below are merely illustrative some of the embodiments of the invention, and those ordinarily skilled in the art can further derive from these drawings other drawings without any inventive effort.

DETAILED DESCRIPTION OF THE INVENTION

Figure 1:
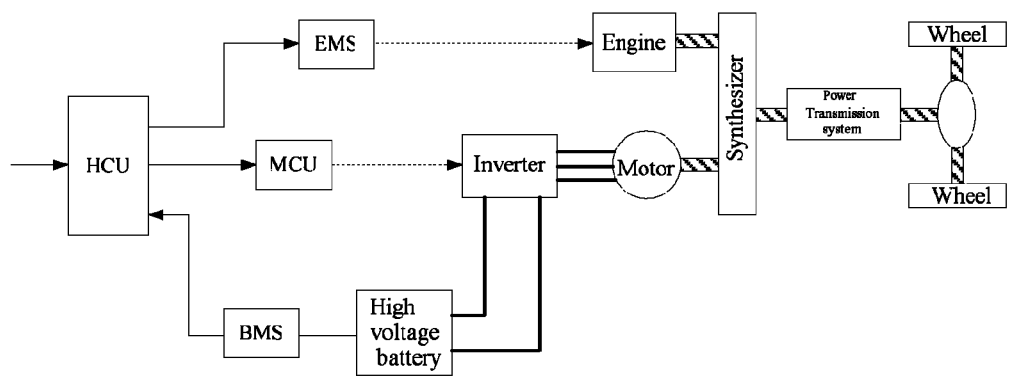
FIG. 1 is a structural block diagram of an existing hybrid powered vehicle system.

With reference to FIG. 1 illustrating a structural block diagram of an existing hybrid powered vehicle system, a Battery Management System (BMS) feeds back battery related parameters to a Hybrid Control Unit (HCU), the HCU sends a torque request to an Engine Management System (EMS) and a Motor Control Unit (MCU) upon reception of a power request, and output torques of a motor and of an engine are superposed to provide a torque required for the vehicle, which is transmitted to a power transmission system and finally wheels to drive the vehicle to run. The magnitude of the torque request sent from the HCU to the MCU determines the magnitude of charging and discharging current of a high voltage battery. The invention is intended to limit the torque request for the purpose of protective limiting of charging and discharging current of battery.

The technical solutions in the embodiments of the invention will be clearly and fully described below with reference to the drawings in the embodiments of the invention to enable those skilled in the art to clearly understand the technical solutions of the invention, and evidently the embodiments to be described are merely a part but not all of the embodiments of the invention. All the other embodiments derived by those ordinarily skilled in the art from the embodiments here without any inventive effort shall come into the protection of scope of the invention.

The HCU determines from voltage and current signals of the high voltage battery whether the battery is in a charging or discharging state, that is, the battery is in a discharging state in the case of positive current or in a charging state in the case of negative current.

When the battery is in a charging state, the HCU multiplies a measured voltage value of the battery by a charging current limit value of the battery to derive a charging limit power $P_1$;

When the actual current value is below an initial control value of charging current (which is experimentally determined from a feature of the battery), an output limit power $P_{limit\_1}$ is $P_1$, a limit torque value is calculated from the output limit power and an angular velocity of the motor and the limit torque value is compared with the requested torque received by the Hybrid Control Unit, and the smaller one of them is a torque request value to be finally sent from the Hybrid Control Unit to the MCU.

When the actual current value is above the initial control value of charging current, PI adjusting is performed with $I_{error}=I_{battery}-I_{charge\_limit}$ to derive a torque deviation value $P_{PI\_1}$, where $P_{battery}$ is the measured current value of the battery, and $I_{charge\_limit}$ is the charging current limit value of the battery.

A resultant output limit power is derived from $P_{PI\_1}$ and $P_1$, i.e., $P_{limit\_1}=P_1+P_{PI\_1}$, a limit torque value is calculated from the output limit power $P_{limit\_1}$ and an angular velocity of the motor and the limit torque value is compared with the requested torque received by the Hybrid Control Unit, and the smaller one of them is a torque request value to be finally sent from the Hybrid Control Unit to the Motor Control Unit MCU.

2. When the battery is in a discharging state, the HCU multiplies a measured voltage value of the battery by a discharging current limit value of the battery to derive a discharging limit power $P_2$;

When the actual current value is below an initial control value of discharging current (which is experimentally determined from a feature of the battery), a output limit power $P_{limit\_2}$ is $P_2$, a limit torque value is calculated from the output limit power and an angular velocity of the motor and the limit torque value is compared with the requested torque received by the Hybrid Control Unit, and the smaller one of them is a torque request value to be finally sent from the Hybrid Control Unit to the MCU.

When the actual current value is above the initial control value of discharging current, PI adjusting is performed with $I_{error}=I_{battery}-I_{discharge\_limit}$ to derive a torque deviation value $P_{PI\_2}$, where $I_{battery}$ is the measured current value of the battery, and $I_{discharge\_limit}$ is the discharging current limit value of the battery.

A resultant output limit power is derived from $P_{PI\_2}$ and $P_2$, i.e., $P_{limit\_2}=P_2+P_{PI\_2}$, a limit torque value is calculated from the output limit power $P_{limit\_2}$ and an angular velocity of the motor and the limit torque value is compared with the requested torque received by the Hybrid Control Unit, and the smaller one of them is a torque request value to be finally sent from the Hybrid Control Unit to the Motor Control Unit.

Figure 2:
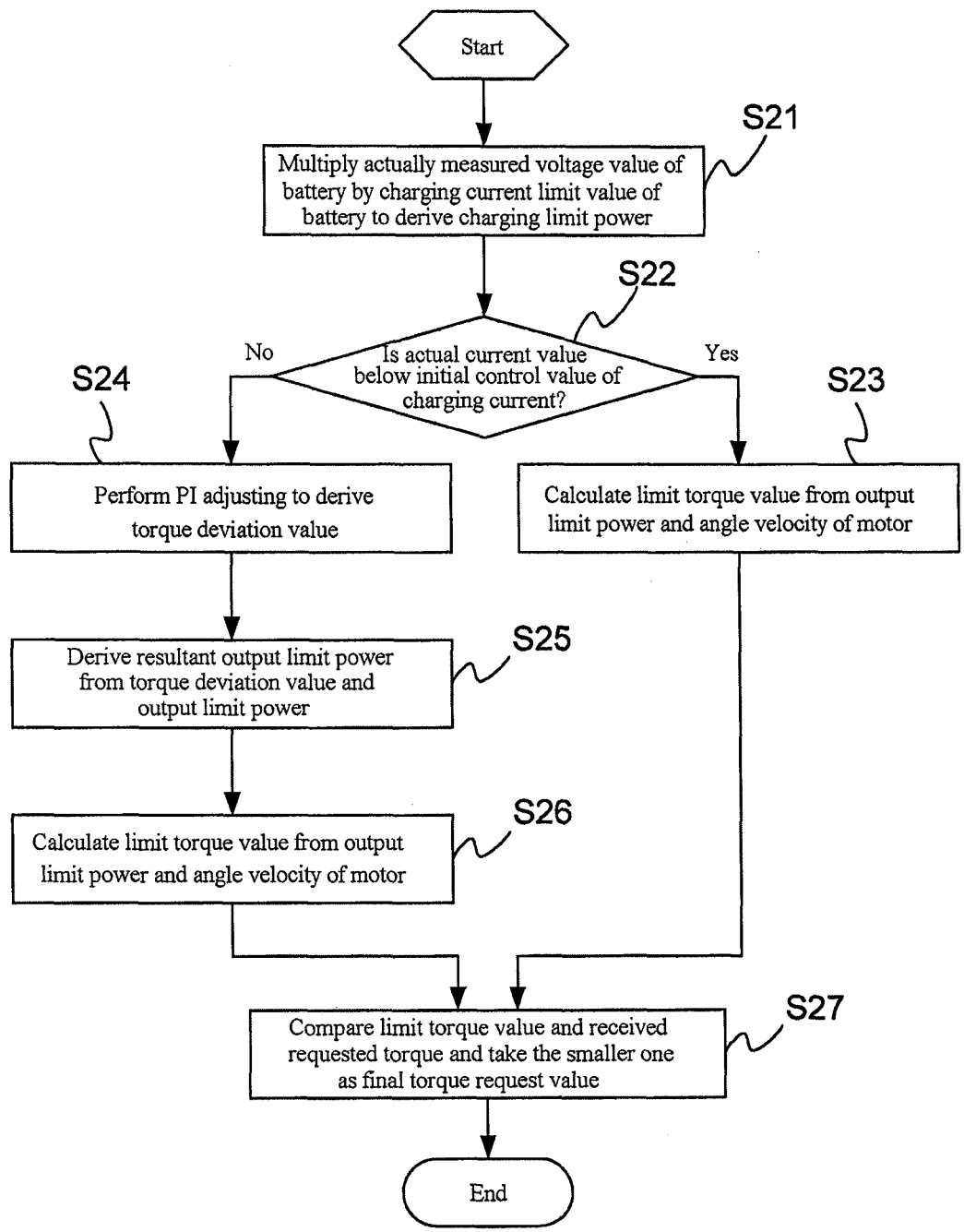
FIG. 2 is a control flowchart for a battery being charged according to an embodiment of the invention.

Generally, a specific process of the method for protective limiting of charging and discharging current of a battery in a hybrid powered vehicle according to an embodiment of the invention is as follows: it is determined whether the battery is in a charging or discharging state; and if it is in a charging state, then a flow corresponding to a charging state proceeds, or if it is in a discharging state, a flow corresponding to a discharging state proceeds.

Where the control flow corresponding to a charging state as illustrated in FIG. 2 includes the following steps:

Step S21. A measured voltage value of the battery is multiplied by a charging current limit value of the battery to derive a charging limit power $P_1$.

Step S22. It is determined whether the actual current value is below an initial control value of charging current, and if so, the flow goes to the step S23; otherwise, the flow goes to the step S24.

Step S23. An output limit power $P_{limit\_1}$ is $P_1$, a limit torque value is calculated from the output limit power and an angular velocity of a motor, and the flow goes to the step S27.

Step S24. PI adjusting is performed with $I_{error}=I_{battery}-I_{charge\_limit}$ to derive a torque deviation value $P_{PI\_1}$, where $I_{battery}$ is the measured current value of the battery, and $I_{charge\_limit}$ is the charging current limit value of the battery, and the flow goes to the step S25.

Step S25-step S26. A resultant output limit power is derived from $P_{PI\_1}$ and $P_1$, i.e., $P_{limit\_1}=P_1+P_{PI\_1}$, a limit torque value is calculated from the output limit power $P_{limit\_1}$ and an angular velocity of the motor, and the flow goes to the step S27.

Figure 3:
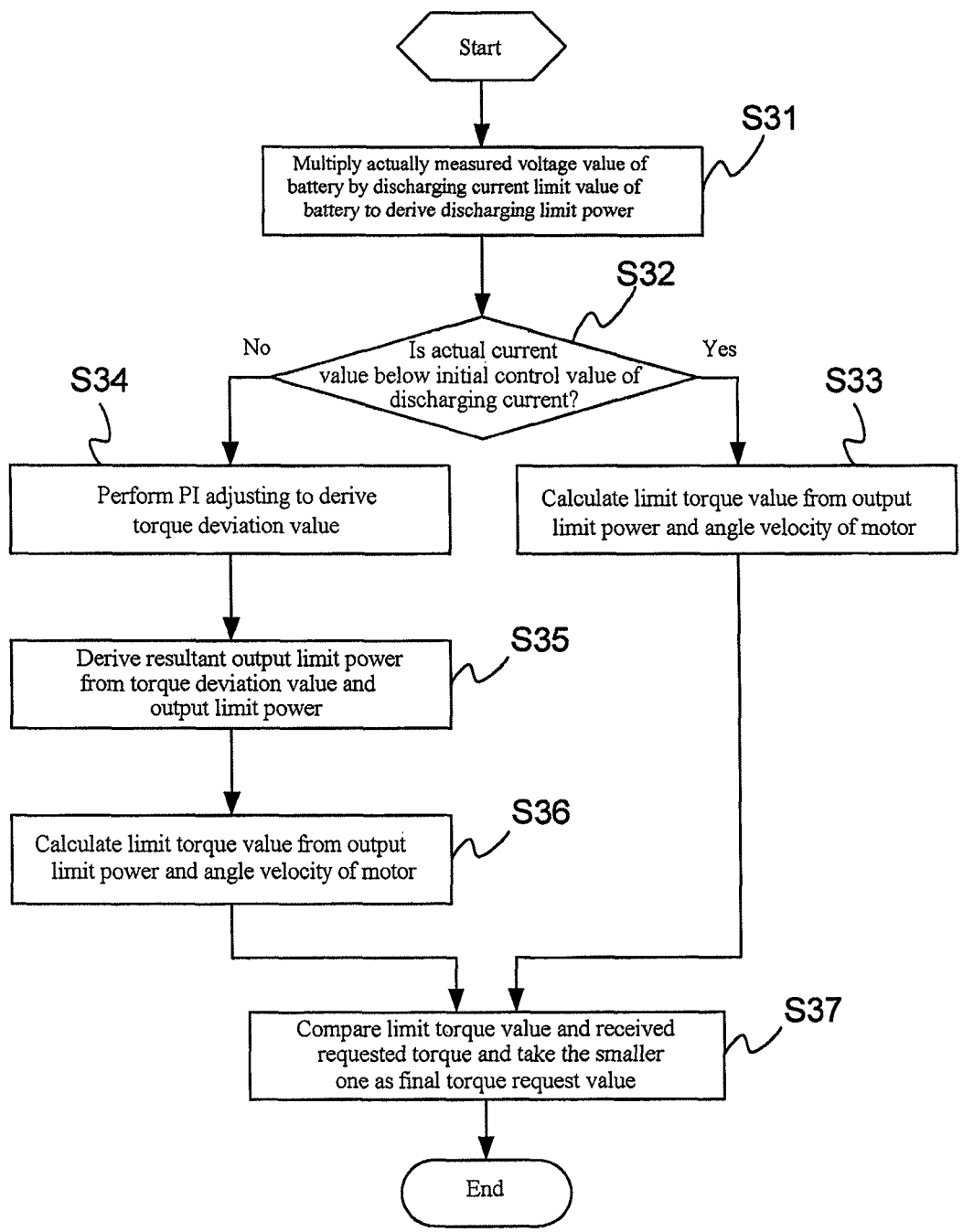
FIG. 3 is a control flowchart for a battery being discharged according to an embodiment of the invention.

Step S27. The limit torque value is compared with a requested torque received by a Hybrid Control Unit, and the smaller one of them is taken as a torque request value to be sent from the Hybrid Control Unit.

Where the control flow corresponding to a discharging state as illustrated in FIG. 3 includes the following steps: p Step S31. A measured voltage value of the battery is multiplied by a discharging current limit value of the battery to derive a discharging limit power $P_2$.

Step S32. It is determined whether the actual current value is below an initial control value of discharging current, and if so, the flow goes to the step S33; otherwise, the flow goes to the step S34.

Step S33. A output limit power $P_{limit\_2}$ is $P_2$, a limit torque value is calculated from the output limit power and an angular velocity of a motor, and the flow goes to the step S37.

Step S34. PI adjusting is performed with $I_{error}=I_{battery}-I_{discharge\_limit}$ to derive a torque deviation value $P_{PI\_2}$, where $I_{battery}$ is the actually measured current value of the battery, and $I_{discharge\_limit}$ is the discharging current limit value of the battery, and the flow goes to the step S35.

Step S35-step S36. A resultant output limit power is derived from $P_{PI\_2}$ and $P_2$, i.e., $P_{limit\_2}=P_2+P_{PI\_2}$, a limit torque value is calculated from the output limit power $P_{limit\_2}$ and an angular velocity of the motor, and the flow goes to the step S37.

Step S37. The limit torque value is compared with a requested torque received by a Hybrid Control Unit, and the smaller one of them is taken as a torque request value to be sent from the Hybrid Control Unit.

As can be seen, in the embodiment of the invention, charging and discharging current can be monitored in real time, and an output torque of the motor is controlled according to variation of current to thereby limit current of the battery within a range for normal operation and achieve a better effect of protective limiting of charging and discharging current of the battery.

Figure 4:
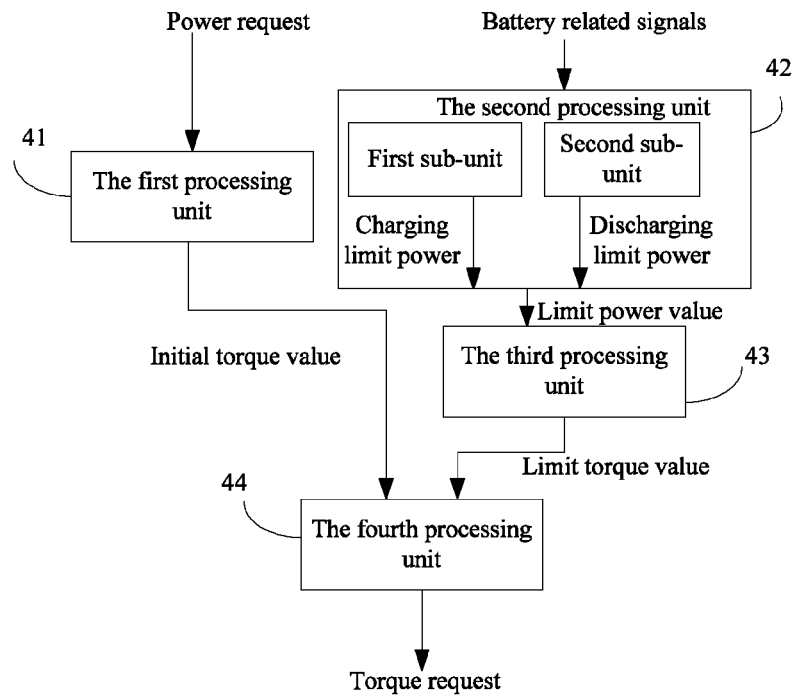
FIG. 4 is a schematic structural diagram of a device for protective limiting of charging and discharging current of a battery in a hybrid powered vehicle according to an embodiment of the invention.

An embodiment of the invention further provides a device for implementing the foregoing method as structured in FIG. 4, which includes a first processing unit 41, a second processing unit 42, a third processing unit 43 and a fourth processing unit 44.

Where:

The first processing unit 41 is adapted to receive a power request and to determine an initial torque value in response to the power request.

The second processing unit 42 is adapted to determine a charging or discharging state of the battery and to calculate a charging or discharging limit power value of the battery from BMS feedback values, where, the BMS feedback values include present maximum charging current, maximum discharging current, maximum voltage, minimum voltage, actual current value and actual voltage value of the battery.

The third processing unit 43 is adapted to calculate a limit torque value from the limit power value and an angular velocity of a motor.

The fourth processing unit 44 is adapted to compare the initial torque value and the limit torque value and to select the smaller one of them as a torque request value to be finally output.

Where the second processing unit 42 can include a first processing sub-unit and a second processing sub-unit: where the first processing sub-unit is adapted to calculate a charging limit power value of the battery when the battery is in a charging state: a measured voltage value of the battery is multiplied by a charging current limit value of the battery to derive a charging limit power $P_1$; and the second processing sub-unit is adapted to calculate a discharging limit power value of the battery when the battery is in a discharging state: a measured voltage value of the battery is multiplied by a discharging current limit value of the battery to derive a discharging limit power $P_2$.

Figure 5:
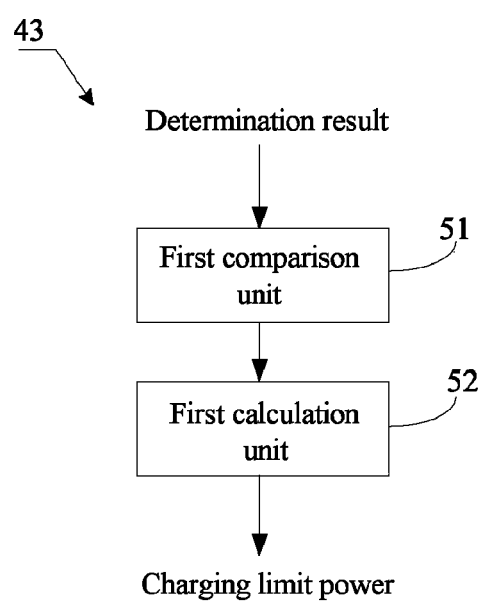
FIG. 5 is a schematic structural diagram of a third processing unit in the device illustrated in FIG. 4.

FIG. 5 illustrates a structural form of the third processing unit 43 including:

A first comparison unit 51 adapted to compare the actual current value and an initial control value of charging current;

A first calculation unit 52 adapted to take a output limit power $P_{limit\_1}$ as $P_1$ and calculate a limit torque value from the output limit power and an angular velocity of the motor when the actual current value is below the initial control value of charging current.

Moreover, the first calculation unit 52 can further be adapted to perform PI adjusting with $I_{error}=I_{battery}-I_{charge\_limit}$ to derive a torque deviation value $P_{PI\_1}$ when the actual current value is above the initial control value of charging current, where $I_{battery}$ is the measured current value of the battery, and $I_{charge\_limit}$ is the charging current limit value of the battery, to derive a resultant output limit power $P_{limit\_1}=P_1+P_{PI\_1}$ from $P_{PI\_1}$ and $P_1$, and to calculate a limit torque value from the output limit power $P_{limit\_1}$ and an angular velocity of the motor.

Figure 6:
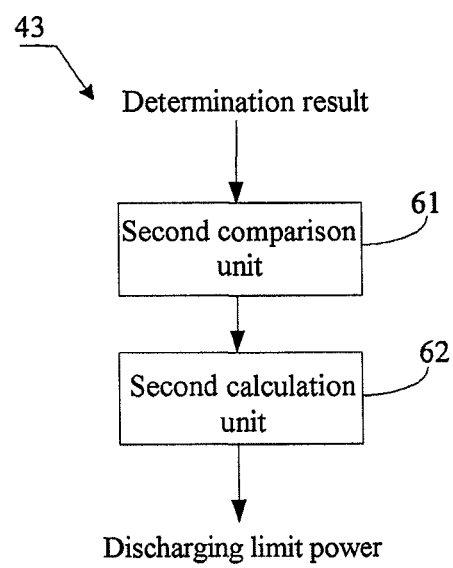
FIG. 6 is another schematic structural diagram of the third processing unit in the device illustrated in FIG. 4.

FIG. 6 illustrates another possible structural form of the third processing unit 43 including a second comparison unit 61 and a second calculation unit 62.

The second comparison unit 61 is adapted to compare the actual current value and an initial control value of discharging current;

The second calculation unit 62 is adapted to take a output limit power $P_{limit\_2}$ as $P_2$ and calculate a limit torque value from the output limit power and an angular velocity of the motor when the actual current value is below the initial control value of discharging current.

Moreover, the second calculation unit 62 can further be adapted to perform PI adjusting with $I_{error}=I_{battery}-I_{discharge\_limit}$ to derive a torque deviation value $P_{PI\_2}$ when the actual current value is above the initial control value of discharging current, where $I_{battery}$ is the measured current value of the battery, and $I_{discharge\_limit}$ is the discharging current limit value of the battery, to derive a resultant output limit power $P_{limit\_2}=P_2+P_{PI\_2}$ from $P_{PI\_2}$ and $P_2$, and to calculate a limit torque value from the output limit power $P_{limit\_2}$ and an angular velocity of the motor.

Figure 7:
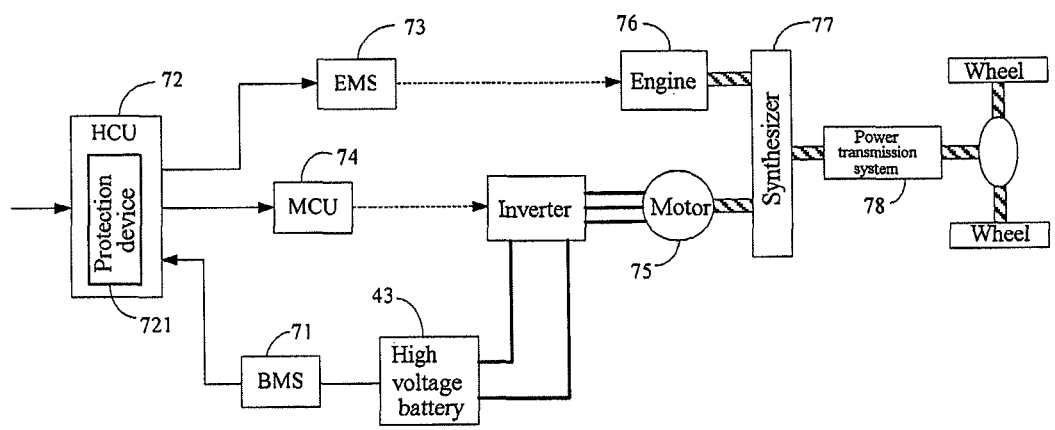
FIG. 7 is a schematic structural diagram of a hybrid powered vehicle system according to an embodiment of the invention.

Moreover, an embodiment of the invention further provides a hybrid powered vehicle system as illustrated in FIG. 7, which includes a BMS 71, an HCU 72, an EMS 73, an MCU 74, a motor 75, an engine 76, a synthesizer 77 and a power transmission system. The HCU 72 includes a device for protective limiting of charging and discharging current of a battery (simply referred to as protection device) 721.

The protection device 721 is adapted to receive a power request and determine an initial torque value in response to the power request; to determine a charging or discharging state of the battery and calculate a limit torque value from an actual current value and a predetermined limit value; and to compare the initial torque value and the limit torque value and select the smaller one of them as a torque request value to be finally output.

The protection device 721 determines a charging or discharging state of the battery according to battery related parameters (voltage and current signals of the battery) fed back from the BMS 71. The protection device 721 transmits the torque request value to the EMS 73 and the MCU 74, both the motor 75 and the engine 76 output a torque under the control of the EMS 73 and the MCU 74, and the synthesizer 77 superposes the output torque of the motor 75 and the output torque of the engine 76 and transmits a resultant torque to the power transmission system 78 and finally wheels to drive a vehicle to run.

For details of the specific components and structure of the protection device 721, reference can be made to the foregoing descriptions of the device as well as FIG. 4, FIG. 5 and FIG. 6.

Those skilled in the art can appreciate that information, a message and a signal can be represented with any one of various processes and techniques. For example, the message and information mentioned in the foregoing descriptions can be represented as a voltage, current, electromagnetic wave, magnetic field, magnetic particle or any combination thereof.

Those skilled in the art can further appreciate that the respective illustrative units and algorithm steps described in connection with the embodiments disclosed in the specification can be implemented with electric hardware, computer software or a combination of both, and the respective illustrative components and steps have been functionally described in general as above in order to clearly describe interchangeability of hardware and software. Whether these functions are implemented in hardware or software depends upon specific applications and design constraining conditions of technical solutions. Those skilled in the art can implement the described functions using different methods for each specific application without departing from the scope of the invention.

The steps of the method or algorithm described in connection with the embodiments disclosed in the specification can be implemented directly in hardware, a software module executed by a processor or a combination of both. The software module can be built in a Random Access Memory (RAM), a memory, a Read Only Memory (ROM), an electrically programmable ROM, an electrically erasable programmable ROM, a register, a hard disk, a removable disk, a CD-ROM or a storage medium in any other form well known in the art.

The foregoing descriptions of the disclosed embodiments enable those skilled in the art to implement or use the invention. Various modifications of these embodiments are apparent to those skilled in the art, and the general principal defined in the specification can be put into practice in other embodiments without departing from the spirit or scope of the invention. Therefore, the invention will not be limited to these embodiments illustrated here but will be accorded with the broadest scope in agreement with the principal and novel features disclosed here.

What is claimed is:

1. A method for protective limiting of charging and discharging current of a battery in a hybrid powered vehicle, comprising:
   receiving a power request and determining an initial torque value in response to the power request, by a processor;
   determining, by the processor, a charging or discharging state of the battery, and calculating, by the processor, a limit torque value from a measured current value; and
   comparing the initial torque value and the limit torque value and selecting the smaller one of them as a torque request value to be finally output to a motor control unit, by the processor,
   wherein calculating the limit torque value comprises when the battery is in a discharging state,
      multiplying by a Hybrid Control Unit a measured voltage value of the battery by a discharging current limit value of the battery to derive a discharging limit power $P_2$; and
      when the measured current value is below an initial control value of discharging current, taking a output limit power $P_{limit\_2}$ as $P_2$, and calculating a limit torque value from the output limit power and an angular velocity of the motor.

2. The method according to claim 1, wherein calculating the limit torque value further comprises:
   when the measured current value is above the initial control value of discharging current, performing Proportional integral feedback, PI, adjusting with $I_{error}=I_{battery}-I_{discharge\_limit}$ to derive a torque deviation value $P_{PI\_2}$, wherein $I_{battery}$ is the measured current value of the battery, and $I_{discharge\_limit}$ is the discharging current limit value of the battery; deriving a resultant output limit power $P_{limit\_2}=P_2+P_{PI\_2}$ from $P_{PI\_2}$ and $P_2$; and calculating a limit torque value from the output limit power $P_{limit\_2}$ and an angular velocity of the motor.

3. The method according to claim 1, wherein determining a charging or discharging state of the battery comprises: determining a charging or discharging state of the battery from voltage and current signals of the high voltage battery.

4. A device for protective limiting of charging and discharging current of a battery in a hybrid powered vehicle, comprising:
   a processor adapted to
   receive a power request and to determine an initial torque value in response to the power request,
   determine a charging or discharging state of the battery and to calculate a limit power value of charging or discharging the battery from BMS feedback values, the BMS feedback values at least comprising a measured current value of the battery,
   calculate a limit torque value from the limit power value and an angular velocity of a motor, and
   compare the initial torque value and the limit torque value and to select the smaller one of them as a torque request value to be finally output to a motor control unit,
   wherein calculating the limit torque value from the limit power value and an angular velocity of the motor comprises
      a comparison unit adapted to compare a measured current value and an initial control value of discharging current; and
      a calculation unit adapted to calculate a limit torque value from the output limit power P.sub.2 and an angular velocity of the motor when the measured current value is below the initial control value of discharging current; and to perform Proportional integral feedback PI adusting with $I_{error}=I_{battery}-I_{discharge\_limit}$ to derive a torque deviation value $P_{PI\_2}$, wherein $I_{battery}$ is the measured current value of the battery, and $I_{discharge\_limit}$ is the discharging current limit value of the battery, to derive a resultant output limit power $P_{limit\_2}=P_2+P_{PI\_2}$ from $P_{PI\_2}$ and $P_2$, and to calculate a limit torque value from the output limit power $P_{limit\_2}$ and an angular velocity of the motor when the measured current value is above the initial control value of discharging current.

5. A hybrid powered vehicle system, comprising a Battery Management System BMS, a Hybrid Control Unit HCU, an Engine Management System EMS, a Motor Control Unit MCU, a motor, an engine, a synthesizer and a power transmission system, wherein the HCU comprises a device for protective limiting of charging and discharging current of a battery and the device comprises:
   a processor adapted to
   receive a power request and to determine an initial torque value in response to the power request,
   determine a charging or discharging state of the battery and to calculate a limit power value of charging or discharging the battery from BMS feedback values, the BMS feedback values at least comprising a measured current value of the battery,
   calculate a limit torque value from the limit power value and an angular velocity of a motor, and
   compare the initial torque value and the limit torque value and to select the smaller one of them as a torque request value to be finally output to the motor control unit,
   wherein calculating the limit torque value from the limit power value and an angular velocity of the motor comprises
      a comparison unit adapted to compare a measured current value and an initial control value of discharging current; and
      a calculation unit adapted to calculate a limit torque value from the output limit power P.sub.2 and an angular velocity of the motor when the measured current value is below the initial control value of discharging current; and to perform Proportional integral feedback, PI, adjusting with $I_{error}=I_{battery}-I_{discharge\_limit}$ to derive a torque deviation value $P_{PI\_2}$, wherein $I_{battery}$ is the measured current value of the battery, and $I_{discharge\_limit}$ is the discharging current limit value of the battery, to derive a resultant output limit power $P_{limit\_2}=P_2+P_{PI\_2}$ from $P_{PI\_2}$ and $P_2$, and to calculate a limit torque value from the output limit power $P_{limit\_2}$ and an angular velocity of the motor when the measured current value is above the initial control value of discharging current.

* * * * *